US010453475B2

(12) United States Patent
Venkataramani et al.

(10) Patent No.: US 10,453,475 B2
(45) Date of Patent: Oct. 22, 2019

(54) AUTOMATIC VOICEOVER CORRECTION SYSTEM

(71) Applicant: Adobe Inc., San Jose, CA (US)

(72) Inventors: Shrikant Venkataramani, Urbana, IL (US); Paris Smaragdis, San Francisco, CA (US); Gautham Mysore, San Francisco, CA (US)

(73) Assignee: Adobe Inc., San Jose, CA (US)

( * ) Notice: Subject to any disclaimer, the term of this patent is extended or adjusted under 35 U.S.C. 154(b) by 67 days.

(21) Appl. No.: 15/432,249

(22) Filed: Feb. 14, 2017

(65) Prior Publication Data

US 2018/0233162 A1 Aug. 16, 2018

(51) Int. Cl.

| | |
|---|---|
| ***G10L 21/00*** | (2013.01) |
| ***G10L 15/00*** | (2013.01) |
| ***G10L 21/055*** | (2013.01) |
| ***G06F 3/16*** | (2006.01) |
| ***G10L 25/51*** | (2013.01) |
| ***G11B 27/02*** | (2006.01) |
| ***G10L 21/02*** | (2013.01) |

(52) U.S. Cl.

CPC ............ *G10L 21/055* (2013.01); *G06F 3/165* (2013.01); *G10L 21/02* (2013.01); *G10L 25/51* (2013.01); *G11B 27/02* (2013.01)

(58) Field of Classification Search

None

See application file for complete search history.

(56) References Cited

U.S. PATENT DOCUMENTS 7,116,676 B2 * 10/2006 Laurent .................. H04H 20/26 370/436
8,505,048 B2 * 8/2013 Yun ...................... H04H 20/426 725/38
8,972,416 B1 * 3/2015 Rifkin ..................... H04W 4/70 707/749
9,922,665 B2 * 3/2018 Matthews ............... G10L 21/10
2009/0299748 A1 * 12/2009 Basson ................... G10L 21/02 704/270
2013/0151251 A1 * 6/2013 Herz ....................... G10L 15/26 704/235

(Continued)

*Primary Examiner* — Satwant K Singh

(74) *Attorney, Agent, or Firm* — Kilpatrick Townsend & Stockton LLP

(57) ABSTRACT

In some aspects, errors are replaced within an audio file by receiving a first audio sequence and a second audio sequence. The first audio sequence includes an erroneous subsequence and the second audio sequence includes a corrected subsequence for inclusion in the first audio sequence to replace the erroneous subsequence. The location of the erroneous subsequence in the first audio sequence is determined by applying a suitable matching operation (e.g., dynamic time warping). One or more matching subsequences of the first audio sequence located proximate to the erroneous subsequence in the first audio sequence and matching corresponding subsequences of the second audio sequence are located proximate to the corrected subsequence. A corrected first audio sequence is generated by replacing the erroneous subsequence and a matching subsequence of the first audio sequence with the corrected subsequence and the matching corresponding subsequence of the second audio sequence.

20 Claims, 5 Drawing Sheets

(56) References Cited

U.S. PATENT DOCUMENTS

| | | | | |
|---|---|---|---|---|
| 2018/0024630 | A1* | 1/2018 | Goossens | G06F 3/013 |
| | | | | 345/156 |
| 2018/0052922 | A1* | 2/2018 | Tait | G06F 17/30778 |
| 2018/0130465 | A1* | 5/2018 | Kim | G10L 15/22 |

* cited by examiner

AUTOMATIC VOICEOVER CORRECTION SYSTEM

TECHNICAL FIELD

This disclosure relates generally to computer-implemented methods and systems for automated editing audio files to correct errors in voiceover recordings by replacing the portions of the voiceover recordings containing the errors with new recordings containing corrected audio.

BACKGROUND

The amount of speech-based audio and audio-visual content created for human consumption has substantially increased. Such content has led to the extensive use of narration track recordings in the form of speeches, podcasts, advertisements, films, tutorial videos etc. Additionally, the duration of these recordings often exhibit a large variability, ranging from a few seconds to over multiple hours of recordings. Audio editing tools have enabled the user to manipulate audio signals by using a multitude of operations to create a high-quality narration audio. Content-based editing tools and tools that provide immediate feedback about the speech have been proposed for efficiently recording narration tracks.

However, the creation of narration tracks is an error-prone process. Unintentional mispronunciations, pauses, non-lexical utterances (e.g., "huh," "um," "like," etc.), and other speech disfluencies are commonly encountered in narration tracks. Sudden transient events in uncontrolled environments (e.g., a sneeze in a lecture) can also obscure one or more words of the narration audio. A process known as "redubbing" enables such errors to be corrected without having to re-record an entire narration sequence.

An illustrative example of the process of redubbing includes the case of replacing an incorrect word in an audio recording. A user may re-record only the sentence that contains the wrong word, manually determine the position of the error in the original recording, and replace the error by the new correct sentence. But the position of the error may be difficult to determine. For instance, manually redubbing certain speech signals are prohibitively difficult due if a user is unfamiliarity with sophisticated audio editing tools, even if the audio recording is relatively short (e.g., less than one minute). In instances where the audio recording including the error is more robust (e.g., a few hours or longer), locating the error may be difficult even for the most knowledgeable users.

Further, once the error is identified, replacing the error with the corrected audio in a seamless manner may be difficult. For example, variations in acoustics or background noise included in the recordings (e.g., the original and replacement audio recordings being recorded in different rooms having different acoustic properties) may result in the corrected portion being easily detectable in the redubbed audio recording.

SUMMARY

Certain aspects of the present disclosure involve automatically detecting and replacing erroneous sequences of an audio recording. In one aspect, errors are replaced within an audio file by receiving a first audio sequence and a second audio sequence. The first audio sequence includes an erroneous subsequence and the second audio sequence includes a corrected subsequence for inclusion in the first audio sequence to replace the erroneous subsequence. The location of the erroneous subsequence in the first audio sequence is determined by applying a suitable matching operation (e.g., dynamic time warping). One or more matching subsequences of the first audio sequence located proximate to the erroneous subsequence in the first audio sequence and matching corresponding subsequences of the second audio sequence are located proximate to the corrected subsequence. A corrected first audio sequence is generated by replacing the erroneous subsequence and a matching subsequence of the first audio sequence with the corrected subsequence and the matching corresponding subsequence of the second audio sequence.

BRIEF DESCRIPTION OF THE FIGURES

These and other features, embodiments, and advantages of the present disclosure are better understood when the following Detailed Description is read with reference to the accompanying drawings.

DETAILED DESCRIPTION

Figure 1:
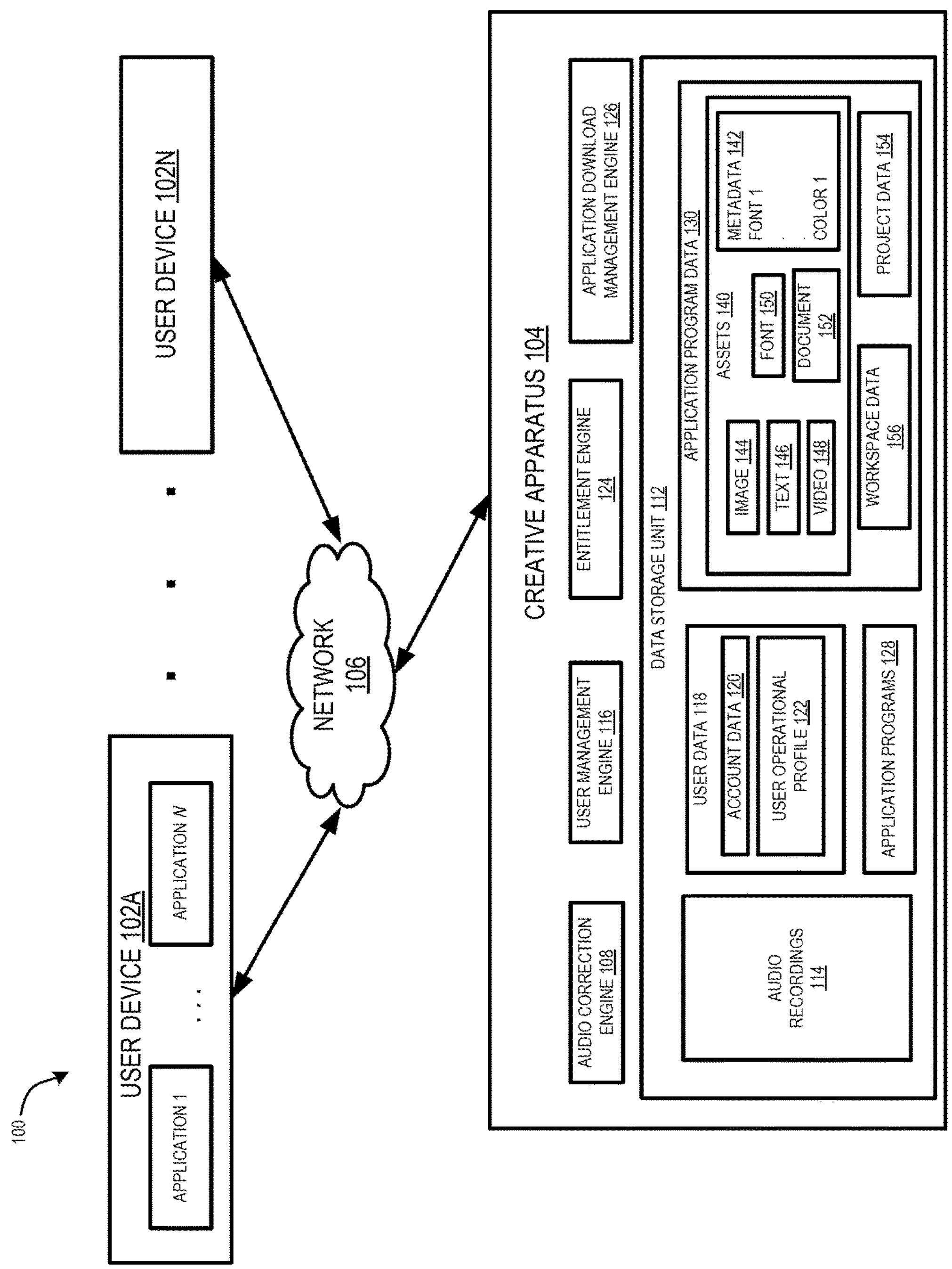
FIG. 1 is a block diagram depicting an example of a network environment for correcting erroneous sequences of an audio recording according to an aspect of the present disclosure.

Certain aspects involve correcting errors within an audio file by automatically locating the errors and replacing (e.g., redubbing) the audio sequence of the audio file including the errors with a corrected audio sequence. As explained above, manual solutions for locating errors in an audio file are not easily applicable to all users or to audio recordings of all lengths. Further, manually replacing the error with a corrected audio sequence can be difficult and tedious to yield an audio file wherein the corrected audio sequence is substantially indistinguishable from the original audio sequence. Certain aspects described herein produce a corrected audio file in which a corrected audio sequence that is automatically crossfaded with the original audio sequence based on a correlation of the original and corrected audio sequences. The errors replaced by the corrected audio sequence in the original audio file are detected using this correlation by applying dynamic time warping or another suitable matching algorithm to the corrected audio sequence to align the original audio sequence and the corrected audio sequence for comparison.

The following non-limiting example is provided to introduce certain exemplary embodiments. In this example, an original audio file includes an audio sequence containing a two-hour lecture recorded by a professor for dissemination to students who are unable to attend in-person. The recorded version of the lecture may include incorrect statistical information (e.g., "Approximately 60% of all patients administered the medication were cured within a week" rather than "Approximately 70% of all patients administered the medication were cured within a week"). To correct this error, a voiceover system according to aspects of the present disclosure enables using a replacement audio sequence for updating the lecture recording to reflect the correct statistical information. In one example, the voiceover system is used to record a new audio sequence including the correct statistical information, where original audio sequence having the erroneous information is replaced with the newly recorded audio sequence. In another example, the speaker repeats one or more sentences or key phrases during an original recording, and a repeated sentence or phrase is used as a replacement audio sequence for another sentence or phrase containing the error. In some aspects, the voiceover system determines the location of the error (e.g., the position within the audio file where the professor recited "60%") by manipulating both the recording with the error and the replacement recording (e.g., a new recording or a repeated portion of the original recording) to facilitate a correlation between the two recordings. In the correlation process, the error in the original audio sequence is identified by identifying the divergent data sequences between the two recordings.

Continuing with this example, the recordings are manipulated by acoustically matching the recordings such that the two recordings sound as if they were recorded in the same environment. For instance, in this example, if the original recording was recorded in a lecture hall and the corrected audio sequence was recorded in an enclosed office, the acoustics in each environment may differ dramatically to prevent the correlation from recognizing similarities between matching words in the respective audio recordings. In an acoustic matching process, the audio signals of the audio recordings are filtered or otherwise modified to suppress, retain, or otherwise modify various frequency components of the audio recordings above a cut-off frequency. For instance, the audio signals of the audio recordings may be modified such that room acoustics (i.e., energies of various frequency components) are matched. The frequency components may be incrementally modified until the two recordings have similar acoustic features (e.g., loudness, echoes, pitch changes, etc.). The acoustically matched recordings may then be correlated to identify and correct the error in the original recording.

In some aspects, a suitable matching process is applied to the acoustically matched audio recordings. An example of a suitable matching process is dynamic time warping. The dynamic time warping includes modifying one of the two audio recordings by stretching or compressing the length of the recording to match the other. For example, if the corrected audio recording is shorter than a sequence of the original audio recording, the corrected audio recording is modified such that the corrected audio recording is a stretched version of the original audio recording. Applying the dynamic time warping generates a warping map that maps each element of the corrected audio recording to its closes equivalent (or matching) element in the original recording. The matching sequences between the two audio recordings are identified to determine the general location in the original audio recording to be replaced by the corrected audio recording. The portion of the original audio recording within the identified location that does not have matching elements in the corrected audio recording corresponds to the error to be replaced by the corresponding portion of the corrected audio recording at the same position.

In certain aspects, the portion of the original audio recording to be replaced by the corrected audio recording is centered around the location of the error. For example, if the location of the error is identified, the duration of the audio sequence of the original audio recording is measured from the error such that there is an equivalent time on each side of the error (e.g., two seconds on each side of the error). In further aspects, the time measured on each side of the error is equivalent or proportional to the length of the error (e.g., a two-second error yields a six-second sequence with two seconds on each side of the error).

The corresponding sequence in the corrected audio recording includes audio that substantially matches the original audio sequence during the recording surrounding the error and diverges from the original audio sequence during the area. If the appropriate sequences of the original and corrected audio recordings are determined, the voiceover system replaces the original audio sequence with the corrected audio sequence. In some aspects, crossfading is used to transition from the original audio recording prior to the erroneous sequence to the corrected audio recording and back to the original audio recording subsequent to the erroneous sequence. For example, at the beginning of the replacement, the volume of the corrected audio sequence of the original audio recording is incrementally increased over a predefined duration (e.g., 46.4 milliseconds) as the volume of the erroneous audio sequence of the original audio recording is simultaneously decreased by a proportionate amount. At the end of the replacement, the crossfade technique is reversed to fade out the corrected audio sequence and fade in the original audio sequence. In some aspects, the rate of change in the volume during the crossfading is determined by the correlation between the original audio sequence and the corrected audio sequence within the duration of the crossfade. A linear crossfade may be applied where the recordings are highly correlated. A constant power crossfade may be applied where the recordings are uncorrelated.

In some aspects, a voiceover correction system that implements the techniques disclosed herein provides several advantages over existing systems. For example, the voiceover correction system provides a simple method for users of any skill or ability to edit audio files. Further, the voiceover correction system provides an efficient method for automatically locating and replacing error while preserving processing power. For example, conventional systems may require applying multiple iterations of matching algorithms along different audio sequences within the audio files to identify the correct position of the error. The use of dynamic time warping and other techniques described herein to identify and replace an error reduces the processing time significantly as a single correlation of the files yields the desired location information to correct the error. This is particularly useful where one or both of the audio files is long (e.g., an hour or more).

Turning now to the drawings, FIG. 1 is an example of a networking environment 100 usable for editing audio recordings according to an aspect of the present disclosure. The environment 100 includes one or more user devices, such as a user device 102A-102N. Each of the user devices 102A-102N is connected to a creative apparatus 104 via a network 106. A user of the user device uses various products, applications, or services supported by the creative apparatus 104 via the network 106. The user devices correspond to various users. Examples of the users include, but are not limited to, creative professionals or hobbyists who use creative tools to generate, edit, track, or manage creative content such as voice recordings 114, marketing professionals who use marketing tools to generate, edit, track, or manage online content, or to manage online marketing process, end users, administrators, users who use document tools to create, edit, track, or manage documents, advertisers, publishers, developers, content owners, content managers, content creators, content viewers, content consumers, designers, editors, any combination of these users, or any other user who uses digital tools to create, edit, track, or manages digital experiences.

Examples of the user devices include, but are not limited to, a personal computer, a smartphone, a mobile phone, a tablet computer, a desktop computer, a processing unit, any combination of these devices, or any other suitable device having one or more processors. Examples of the network 106 include, but are not limited to, internet, local area network (LAN), wireless area network, wired area network, wide area network, and the like.

The creative apparatus 104 includes one or more engines for providing one or more digital experiences to the user. In some aspects, these engines include one or more of the engines depicted in FIG. 1. In other embodiments, one or more of the engines depicted in FIG. 1 may be omitted from the creative apparatus 104. The creative apparatus 104 can be implemented using one or more servers, one or more processing devices, one or more platforms with corresponding application programming interfaces, cloud infrastructure, or the like. In addition, each engine can also be implemented using one or more servers, one or more processing devices, one or more platforms with corresponding application programming interfaces, cloud infrastructure, or the like. The creative apparatus 104 also includes a data storage unit 112. The data storage unit 112 can be implemented as one or more databases or one or more data servers. The data storage unit 112 includes data that is used by the engines of the creative apparatus 104.

In FIG. 1, the creative apparatus 104 includes an audio correction engine 108. The audio correction engine 108 may include or use a set of rules to allow the creative apparatus to automatically edit audio recordings 114 stored in the data storage unit 114. The audio correction engine 108 is accessible to the user of a user device 102A-102N via the network 106. In some aspects, the audio correction engine 108 is executed by the creative apparatus 104. In additional and alternative aspects, the audio correction engine 108 is executed by another device, such as a user device 102A via an application, such as one of the applications 1-N stored on the user device 102A. In one example, a user may select two audio recordings 114 stored in the data storage unit 114. The user may be presented with a graphical user interface from which the user can select and designate one audio recording 114 as including an erroneous audio sequence and a second audio recording 114 as including a corrected audio sequence (e.g., a new recording or a repeated portion of the original recording). The audio correction engine 114 may automatically locate the erroneous audio sequence in the first audio recording 114 and replace it with the corrected audio sequence of the second audio sequence 114.

In some embodiments, a user of the user device 102A visits a webpage or an application store to explore applications and engines supported by the creative apparatus 104 (e.g., the audio correction engine 108). In one example, the creative apparatus 108 provides the applications and engines as a software as a service (SaaS), or as a standalone application that can be installed on the user device 102A, or as a combination. In some embodiments, the user creates an account with the creative apparatus 104 by providing user details and by creating login details. Alternatively, the creative apparatus 104 can automatically create login details for the user in response to receipt of the user details. In some aspects, the user is also prompted to install an application manager. The application manager enables the user to manage installation of various applications supported by the creative apparatus 104 and to manage other functionalities, such as updates, subscription accounts, and the like, associated with the applications. The user details are received by a user management engine 116 and stored as user data 118 in the data storage unit 112. In some aspects, the user data 118 further includes account data 120 under which the user details are stored.

In some embodiments, the user either can opt for a trial account or can make payment based on the type of account or subscription chosen by the user. Alternatively, the payment can be based on product or number of products chosen by the user. In some embodiments, based on payment details of the user, a user operational profile 122 is generated by an entitlement engine 124. The user operational profile 122 is stored in the data storage unit 111 and indicates entitlement of the user to various products or services. In some embodiments, the user operational profile 122 also indicates type of user, i.e., free, trial, student, discounted, or paid. In some embodiments, the user management engine 116 and the entitlement engine 124 can be one single engine performing the functionalities of both the engines.

In some embodiments, the user installs various applications supported by the creative apparatus 104 via an application management download engine 126. Application installers or application programs 128, which may include a copy of an application corresponding to the audio correction engine 108 or other software usable with the audio recordings 114 to perform operations described herein, are present in the data storage unit 112 and are fetched by the application management download engine 126. These application are made available to the user directly or via the application manager. In some embodiments, all application programs 128 are fetched and provided to the user via an interface of the application manager. In other embodiments, application programs 128 for which the user is eligible based on user's operational profile are displayed to the user. The user selects the application programs 128 or the applications that the user wants to download. The application programs 128 are downloaded on the user device 102A by the application manager via the application management download engine 126. Corresponding data regarding the download is also updated in the user operational profile 122. An application program 128 is an example of a digital tool. The application management download engine 126 also manages a process of providing updates to the user device 102A.

In some embodiments, upon download, installation, and launching of an application program, the user is asked to provide the login details. A check is again made by the user management engine 116 and the entitlement engine 124 to ensure that the user is entitled to use the application program. In other embodiments, direct access is provided to the application program as the user is already logged into the application manager.

The user uses one or more application programs 128 to create one or more projects or assets. In addition, the user also has a workspace within each application program. The workspace, as described herein, includes setting of the application program, setting of tools or setting of user interface provided by the application program, and any other setting or properties specific to the application program. Each user has a workspace. The workspace, the projects, or the assets are then stored as application program data 130 in the data storage unit 111 by a synchronization engine 132.

The application program data 130 can be specific to the user or can be shared with other users based on rights management.

In some embodiments, the application program data 130 includes one or more assets 140. The assets 140 can be a shared asset that the user wants to share with other users or that the user wants to offer on a marketplace. The assets 140 can also be shared across multiple application programs 128. In some embodiments, each asset includes metadata 142. Examples of the metadata 142 include, but are not limited to, font, color, size, shape, coordinate, a combination of any of these, and the like.

In some embodiments, each asset also includes a file. Examples of the file include, but are not limited to, an image 144, text 146, a video 148, a font 150, a document 152, a combination of any of these, and the like (e.g., an audio recording). In another aspect, an asset only includes the metadata 142. The application program data 130 also include project data 154 and workspace data 156. In some embodiments, the project data 154 includes the assets 140. In additional or alternative embodiments, the assets 140 are standalone assets. Similarly, the workspace data 156 can be part of the project data 154 in some embodiments and may be standalone data in other embodiments.

Figure 2:
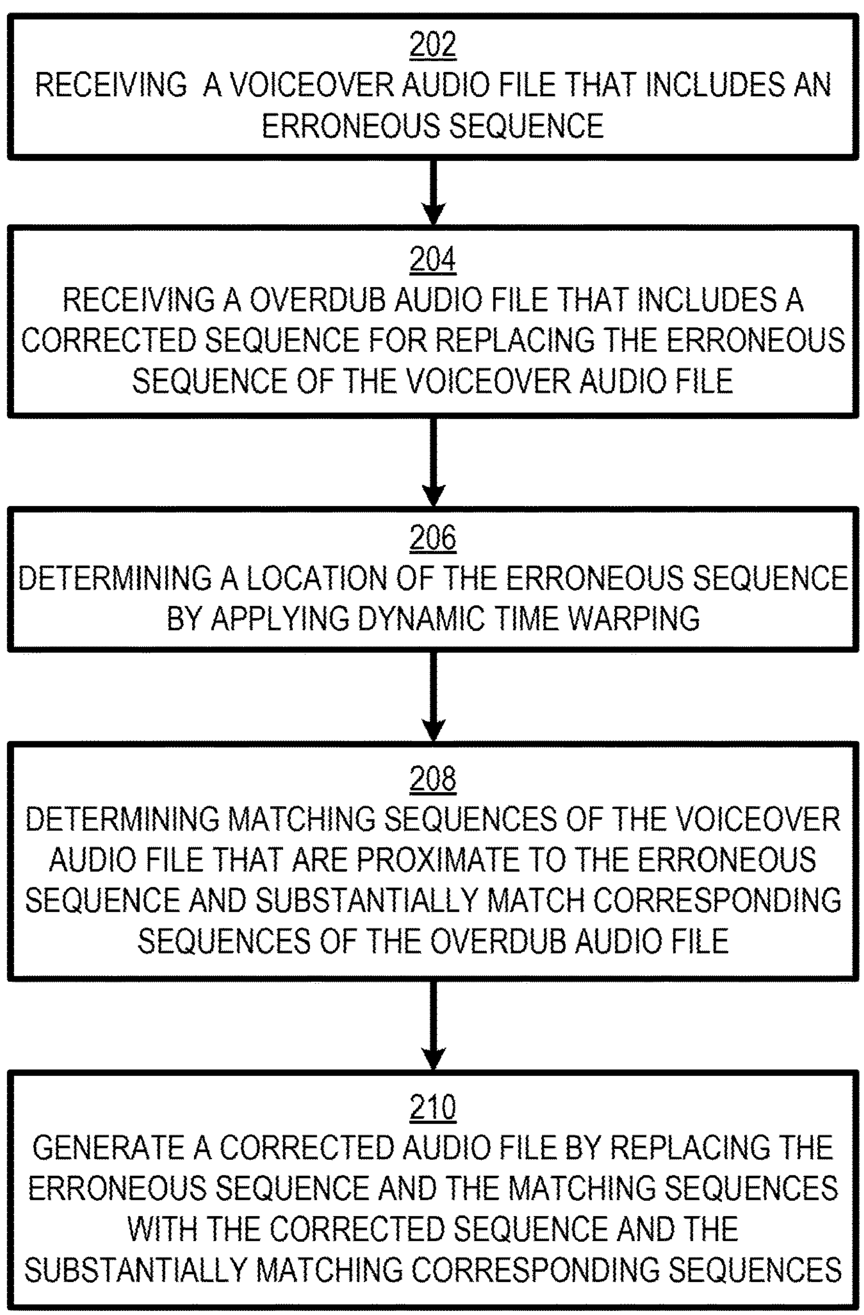
FIG. 2 is a flow chart depicting an example of a process for correcting an erroneous sequence within an audio recording according to an aspect of the present disclosure.

FIG. 2 is a flow chart depicting an example of a process 200 for correcting an erroneous sequence within an audio recording 114 according to an aspect of the present disclosure. The process 200 is described with respect to the network environment 100 of FIG. 1, though other implementations are possible without departing from the scope of the present disclosure.

In block 202, a voiceover audio file is received. In some aspects, the voiceover audio file is received by a processor executing the audio correction engine 108. In one example, the voiceover audio file is an audio recording 114 retrieved by the processor from the data storage unit 112. The voiceover audio file may be designated by the user or retrieved in response to a user request. In another example, the voiceover audio file is uploaded directly by the user via the network 106. The voiceover audio file includes an erroneous sequence that the user of the user device 102A desires to delete and replace in the voiceover audio file.

In block 204, an overdub audio file is received. In some aspects, similar to the voiceover audio file, the overdub audio file is an audio recording 114 stored in the data storage unit 112. The voiceover audio file may be received by the processor executing the audio correction engine 108. For example, the overdub audio file may be designated by the user or retrieved in response to a user request. In another example, the voiceover audio file is uploaded directly by the user via the network 106. The overdub audio file includes a corrected sequence that the user desires for use as a replacement for the erroneous sequence included in the voiceover audio file. In some aspects, the corrected sequence is obtained by re-recording certain content in a session separate from the recording of the voiceover audio file. In additional or alternative aspects, the corrected sequence is obtained by repeating certain content (e.g., one or more sentences or other phrases) within the voiceover audio file and extracting the repeated content as a corrected sequence.

Figure 3:
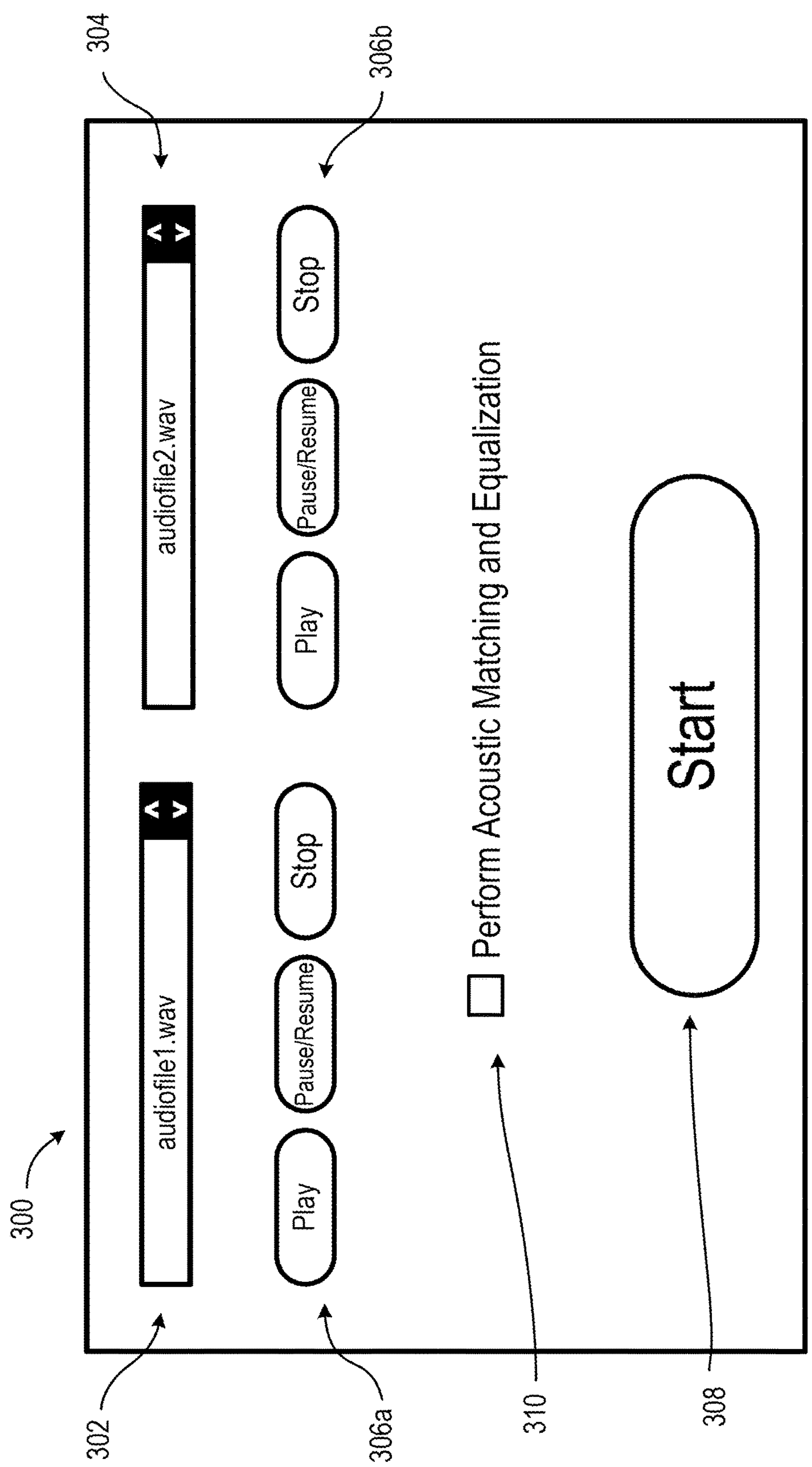
FIG. 3 is a screenshot depicting an example of a graphical user interface for initiating an error-correction process according to an aspect of the present disclosure.

In some aspects, the user designates audio recordings 114 stored in the data storage unit 112 of FIG. 1 as a voiceover audio file or an overdub audio file via a graphical user interface generated by the audio correction engine 108. FIG. 3 is an example of a graphical user interface 300 for designating audio recordings 114 for the correction process. The graphical user interface 300 includes two selection options 302, 304. In some aspects, selection option 302 is used for designating an audio recording 114 as a voiceover audio file including an erroneous audio sequence and selection option 304 is used for designating an audio recording 114 as an overdub audio file including the corrected audio sequence to replace the erroneous audio sequence. In one example, the user may use a selection tool (e.g., a mouse, trackpad, touchscreen, etc.) of the user device 102A to select one of the selection options 302, 304. The graphical user interface 300 may be modified to show multiple audio recordings 114 from which the user selects and designates as the voiceover audio file and the overdub audio file, respectively. In FIG. 3, the audio file named "audiofile1.wav" is selected as the voiceover audio file and the audio file named "audiofile2.wav" is designated as the overdub audio file.

The graphical user interface also includes respective playback selection options 306*a*, 306*b* corresponding to the selection options 302, 304. The playback selection options 306*a*, 306*b* may facilitate the user to play, pause, resume, and stop an audio recording 114 selected for the correction process through user selection via the selection tool of the user device 102A. For example, the playback selection options 306*a*, 306*b* may be used by the user to confirm that the selected files include the erroneous audio sequence and the corrected audio sequences, respectively. Subsequent to the user's designation of the voiceover and overdub audio files via the selection options 302, 304, respectively, the selection option 308, labeled "Start," may be selected by the user to commence the steps of the process 200 described in blocks 206-210 of FIG. 2.

Returning to FIG. 2, in block 206, a location of the erroneous sequence in the voiceover audio file is determined. The location of the erroneous sequence may be determined by applying dynamic time warping or another suitable matching process to the voiceover and overdub audio files received in blocks 202, 204 of the process 200. In some aspects, dynamic time warping is applied by the audio correction engine 108 to the voiceover and overdub audio files to create a warping path that maps the elements of the overdub audio file to the voiceover audio file. The warping path specifically matches each element of the overdub audio file to its closest equivalent element in the voiceover audio file. For instance, where one audio file is shorter or longer than the other, the overdub audio file may be a compressed or stretched version of the voiceover audio file. The matching of the elements of the voiceover and overdub files provide information about the location of the error as the erroneous subsequence within the voiceover audio file will not have a matching elements with the overdub audio file.

In some aspects, user-defined signal transforms (e.g., spectrogram representations, MFCC transforms, MDCTs, etc.) are used to represent the audio signals of the voiceover and overdub audio files for performing dynamic time warping. The user-defined signal transform includes a two-dimensional time-frequency representation that displays the energy of each frequency component of the audio signal over time. Spectrogram representations or other suitable user-defined signal transforms may be used over other visual representations, such as waveform representations, that are more sensitive to variations in pitch and volume.

In some aspects, the audio correction engine 108 may construct a distance matrix d corresponding to the Euclidean distance between the elements of the voiceover audio file, A, and the overdub audio file, B. The distance matrix d may be of size m×n such that the $(i,j)^{th}$ element of d is the Euclidean distance between $a_i$ and $b_j$. The audio correction engine 108 may use the distance matrix to compute a dynamic time warping cost matrix D. In some aspects, the $(i,j)^{th}$ element of matrix D is:

$$D(i, j) = \begin{cases} d(i, j), & \text{if } i = 1 \text{ or } j = 1 \\ d(i, j) + \min\{D(i-1, j), D(i, j-1), D(i-1, j-1)\}, & \text{otherwise,} \end{cases}$$

where the minimum operator returns a minimum input value. A backtracking rule is used to iteratively define the warping path from (m,n) to (1,1). In some aspects, the backtracking rule is defined as:

$$(i, j) = \begin{cases} (1, j-1), & \text{if } i = 1 \\ (i-1, j), & \text{if } j = 1 \\ \operatorname{argmin}\{D(i-1, j-1), D(i-1, j), D(i, j-1), & \text{otherwise} \end{cases},$$

where (i,j) corresponds to the coordinates of the warping path through matrix D. Using the backtracking rule, $P_i$ may denote the sequence of values of i, starting at 1 and ending at m. The gradient $\Delta P_i$ is computed by subtracting the previous element from every element of $P_i$. The element of $P_i$ corresponding to the first non-zero value of $\Delta P_i$ corresponds to the starting position of the matching elements between the voiceover and overdub audio files and the element of $P_i$ corresponding to the last non-zero value of $\Delta P_i$ corresponds to the end position of the match.

In some aspects, prior to locating the error in the voiceover audio file as described in block 206, the voiceover and the overdub audio files are filtered or otherwise modified to reduce noise and other audio variations that may prevent proper correlation of the files. For example, multiple instances of the same utterance may exhibit intentional and unintentional pitch variations (e.g., jitter, shimmer, etc.) even when recorded by the same speaker. A pitch invariant representation, which is determined using a filtering operations, may be used to reduce the differences in pitch prior to correlating the audio files. In one example, pitch invariance is achieved using filters to generate spectrogram representations (or other user-defined signal transforms) of the voiceover and overdub audio files as described above. The audio files are filtered through a filter (e.g., a Mel filter bank) including approximately 40 perpetually motivated filters that are concentrated near the lower frequencies and increasingly spaced at higher frequencies. The higher frequencies may allow a wider range of frequency components to pass through. As the audio signals in each audio file are filtered through the filter bank, the energies of each filter output are computed at sever instances of time. The energies are stacked to yield the transformation matrix representations used to perform the dynamic time warping.

In another example, the voiceover and overdub audio files are recorded in different rooms, resulting in significantly different background noise and volume. A low pass filter may modify the energy of each frequency component in the audio files by multiplying all frequency components below a cut-off frequency by 1 and all frequency components above the cut-off frequency by 0. The filter may be constructed through a trial-and-error procedure that includes incrementally modifying the multiplicative factors of the filter and determining whether the filtered overdub audio recording sounds similar in loudness and background to the voiceover audio file.

In some aspects, the filtering process may be selectively applied during the audio correction process by the user. For example, returning briefly to FIG. 3, the graphical user interface 300 includes an additional selection option 310 that allows the user an option for performing acoustic matching and equalization in accordance with the filtering methods described herein.

In block 208, the processor identifies matching sequences of the voiceover audio file that are proximate to the erroneous sequence and matching corresponding sequences of the overdub audio file. The matching sequences correspond to context surrounding the erroneous sequence. The processor may use the matching sequences to confirm that the located error is the portion of the voiceover audio file intended for replacement with the correct audio subsequence of the overdub audio file. For example, context surrounding the erroneous subsequence of the voiceover audio file will match elements of the overdub audio file on each side of the non-matching, or divergent, portions. Returning to the example scenario for illustration, the professor may repeat the term "60%" multiple times during the lecture. Thus, matching context surrounding the non-matching portions of the respective audio files confirms that the identified location is correct. As used herein, the term "matching" includes equivalent matches and substantially equivalent matches. For example, the audio correction engine 108 may retrieve a threshold value from the data storage unit 112 or another storage location (e.g., a memory device) necessary for determining whether elements are substantially equivalent matches. In some aspects, the threshold value is above 80%. For example, an element having at or above an 80% match is considered substantially equivalent and an element having below an 80% match is considered a non-match. In other aspects, the threshold value is adjustable as desired by a programmer or operator to control the sensitivity of the creative apparatus 104.

The context added to the erroneous sequence (e.g., non-matching portions) may depend on the length of the erroneous sequence. In some aspects, an erroneous sequence of n seconds may cause the audio correction engine 108 to identify approximately n seconds of contact on each side of the error. In this manner, the actual error will be present in the center of the erroneous sequence. In additional and alternative aspects, the audio correction engine 108 may employ additional rules to minimize the audible effects of the audio correction. For example, the starting and ending position of the erroneous sequence may be rounded off to a pause (e.g., a full-stop or a comma) in the audio signal to avoid windowing the audible portions during replacement.

In block 210, the process replaces the erroneous audio sequence and matching sequences on each side of the erroneous audio sequence of the voiceover audio file with the corrected audio sequence and corresponding matching sequences on each side of the corrected audio sequence of the overdub audio file. In some aspects, a crossfading process may be used to insert the sequences of the overdub audio file into the voiceover audio file. The voiceover system uses crossfading to avoid undesirable clicks and pops as the updated audio files transitions between the original voiceover audio file and the overdub audio file. In some aspects, crossfading includes slowly increasing the volume of the overdub audio file over a predefined duration while simultaneously decreasing the volume of the voiceover audio file by a proportionate amount. At the other end of the replacement, the voiceover audio file is faded in and the overdub audio file is faded out. In one example, the predefine duration is 46.4 milliseconds, though other durations may be used based on experimentation.

In some aspects, the loudness of the mixture over the crossfade duration is equal to the loudness of the unchanged portions of the voiceover audio file. The rate of change of volume of the crossfade is controlled by a symmetric fade in and fade out window. In additional and alternative aspects, the shape of the crossfade window is determined by the correlation between the voiceover and the overdub audio files with the duration of the crossfade window. For highly correlated files, a linear crossfade is used. For uncorrelated files, a constant power crossfade is used. In other aspects, the type of crossfade may be selected based on user preference.

Figure 4:
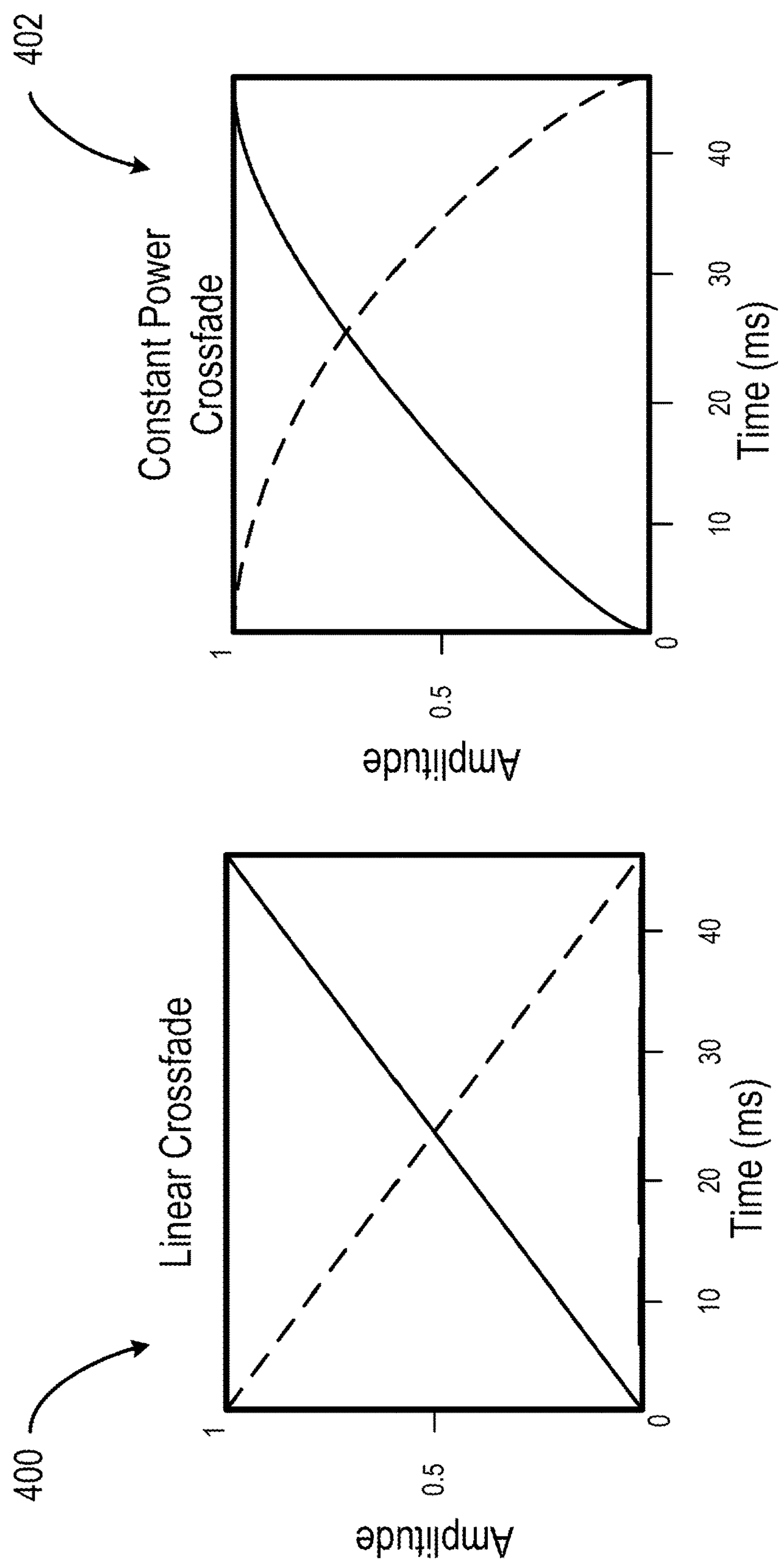
FIG. 4 is a graphical diagram depicting crossfading multiple audio recordings according to an aspect of the present disclosure.

FIG. 4 shows graphs 400, 402 depicting graphical representations of the linear crossfade and the constant power crossfade windows, respectively. The dotted lines depicted in graphs 400, 402 represent the fade out window and the solid lines represent the fade in window over a duration of approximately 46.4 milliseconds within a [0,1] amplitude range. For example, as the corrected audio sequence of the overdub audio file is faded in prior to the erroneous sequence, the dotted lines represent the volume of the voiceover audio file and the solid lines represent the volume of the overdub audio file. As the corrected audio sequence of the overdub audio file is faded out subsequent to the erroneous sequence, the solid lines represent the volume of the voiceover audio file and the dotted lines represent the volume of the overdub audio file.

Figure 5:
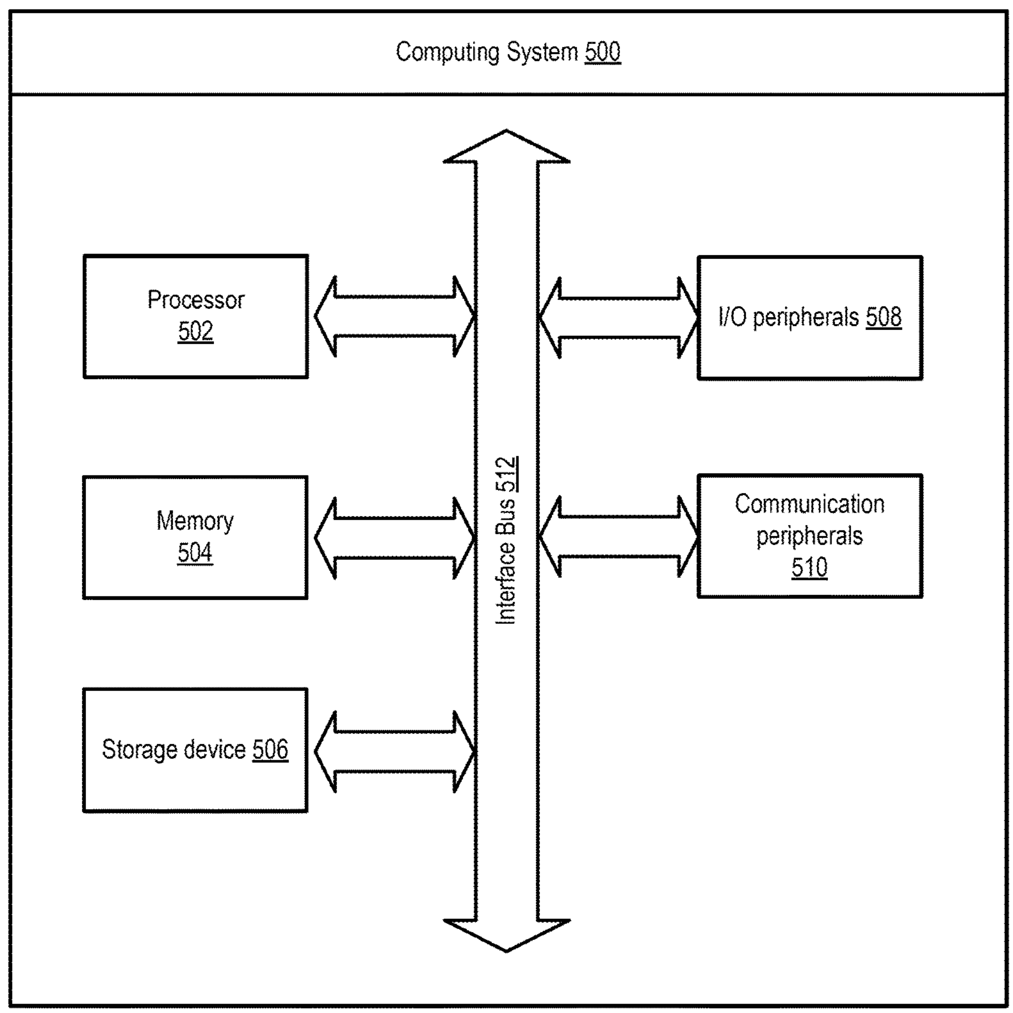
FIG. 5 is a block diagram depicting an example of a computing system for correcting erroneous sequences of an audio recording according to an aspect of the present disclosure.

A suitable computing system may be programmed to perform the operations described herein. For example, FIG. 5 is a block diagram depicting an example of a computing system 500 for semantic segmentation of digital visual media according to an aspect of the present disclosure. Each of the user devices 102A-102N, creative apparatus 104, a component thereof, or other suitable systems implement some or all of the illustrated components. Although these components are illustrated as belonging to the same computing system 500, the computing system 500 can be distributed among multiple computing devices.

The computing system 500 includes at least a processor 502, a memory 504, a storage device 506, input/output peripherals 508, communication peripherals 510, and an interface bus 512. The interface bus 512 is configured to communicate, transmit, and transfer data, controls, and commands among the various components of the computing system 500. The memory 504 and the storage device 506 include computer readable storage media, such as RAM, ROM, electrically erasable programmable read-only memory (EEPROM), hard-drives, CD-ROMs, optical storage devices, magnetic storage devices, electronic non-volatile computer storage, for example Flash® memory, and other tangible storage media. Any of such computer readable storage media can be configured to store instructions or program codes embodying aspects of the disclosure. The memory 504 and the storage device 506 also include computer readable signal media. A computer readable signal medium includes a propagated data signal with computer readable program code embodied therein. Such a propagated signal takes any of a variety of forms including, but not limited to, electromagnetic, optical, or any combination thereof. A computer readable signal medium includes any computer readable medium that is not a computer readable storage medium and that can communicate, propagate, or transport a program for use in connection with the computing system 500.

Further, the memory 504 includes an operating system, programs, and applications. The processor 502 is configured to execute the stored instructions and includes, for example, a logical processing unit, a microprocessor, a digital signal processor, and other processors. The memory 504 and/or the processor 502 can be virtualized and can be hosted within another computing system of, for example, a cloud network or a datacenter. The input and output peripherals 508 include user interfaces such as a keyboard, screen, microphone, speaker, other input/output devices, and computing components such as graphical processing units, serial ports, parallel ports, universal serial bus, and other input/output peripherals. The input/output peripherals 508 are connected to the processor 502 through any of the ports coupled to the interface bus 512. The communication peripherals 510 are configured to facilitate communication between the computing system 500 and other computing devices over a communications network and include, for example, a network interface controller, modem, wireless and wired interface cards, antenna, and other communication peripherals.

While the present subject matter has been described in detail with respect to specific aspects thereof, it will be appreciated that those skilled in the art, upon attaining an understanding of the foregoing may readily produce alterations to, variations of, and equivalents to such aspects. Accordingly, it should be understood that the present disclosure has been presented for purposes of example rather than limitation, and does not preclude inclusion of such modifications, variations, or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Unless specifically stated otherwise, it is appreciated that throughout this specification discussions utilizing terms such as "processing," "computing," "calculating," "determining," and "identifying," or the like, refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general-purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Aspects of the methods disclosed herein may be performed in the operation of such computing devices. The order of the blocks presented in the examples above can be varied—for example, blocks can be re-ordered, combined, or broken into sub-blocks. Certain blocks or processes can be performed in parallel.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, or steps. Thus, such conditional language is not generally intended to imply that features, elements or steps are in any way required for one or more examples or that one or more examples necessarily include logic for deciding, with or without author input or prompting, whether these features, elements or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or arranged compared to the disclosed examples.

What is claimed is:

1. A computer-implemented method usable to automatically replace errors within an audio file, the computer-implemented method comprising:

receiving, by a processing device, a first audio sequence and a second audio sequence, the first audio sequence including an erroneous subsequence and the second audio sequence including a corrected subsequence for replacement of the erroneous subsequence in the first audio sequence;

determining, by the processing device, a location of the erroneous subsequence in the first audio sequence by applying dynamic time warping to correlate the first audio sequence and the second audio sequence;

determining, by the processing device, one or more matching subsequences of the first audio sequence that are (i) located proximate to the erroneous subsequence in the first audio sequence and (ii) match corresponding subsequences of the second audio sequence located proximate to the corrected subsequence;

generating, by the processing device, a corrected first audio sequence by replacing the erroneous subsequence and the one or more matching subsequences of the first audio sequence with the corrected subsequence and the matching corresponding subsequences of the second audio sequence.

2. The computer-implemented method of claim 1, wherein determining the location of the erroneous subsequence includes:

generating, through application of the dynamic time warping, a warping path that maps audio elements of the second audio sequence to equivalent audio elements of the first audio sequence; and identifying non-matching audio elements of the first audio sequence that do not have corresponding audio elements of the second audio sequence mapped thereto, the non-matching audio elements comprising the erroneous subsequence.

3. The computer-implemented method of claim 2, wherein generating the warping path includes manipulating a length of a first signal transform corresponding to the second audio sequence to match a length of a second signal transform corresponding to the first audio sequence.

4. The computer-implemented method of claim 3, wherein manipulating the length of the first signal transform includes stretching the first signal transform to increase the length of the first signal transform.

5. The computer-implemented method of claim 1, wherein determining the one or more matching subsequences includes:

determining a time duration of the erroneous subsequence;

identifying a first portion and a second portion of the first audio sequence located on opposing sides of the erroneous subsequence, the first portion and the second portion each having a same time duration that is at least as long as the time duration of the erroneous subsequence such that the erroneous subsequence is centered between the first portion and the second portion in the first audio sequence.

6. The computer-implemented method of claim 1, further comprising:

acoustically matching the first audio sequence and the second audio sequence by modifying frequency components of the second audio sequence to match an energy of corresponding frequency components of the first audio sequence.

7. The computer-implemented method of claim 6, wherein said acoustically matching further comprises reducing noise from the first audio sequence and the second audio sequence prior to said modifying the frequency components of the second audio sequence.

8. The computer-implemented method of claim 1, wherein generating the corrected first audio sequence includes crossfading the matching corresponding subsequences of the second audio sequence into the first audio sequence.

9. The computer-implemented method of claim 8, further comprising determining, based on correlating the first audio sequence and the second audio sequence, whether said crossfading includes a linear crossfade or a constant power crossfade.

10. A computer system configured to automatically replace errors within an audio file, the computer system comprising:

means for receiving a first audio sequence and a second audio sequence, the first audio sequence including an erroneous subsequence and the second audio sequence including a corrected subsequence for replacement of the erroneous subsequence in the first audio sequence;

means for determining a location of the erroneous subsequence in the first audio sequence by applying dynamic time warping to correlate the first audio sequence and the second audio sequence;

means for determining one or more matching subsequences of the first audio sequence that are (i) located proximate to the erroneous subsequence in the first audio sequence and (ii) match corresponding subsequences of the second audio sequence located proximate to the corrected subsequence;

means for generating a corrected first audio sequence by replacing the erroneous subsequence and the one or more matching subsequences of the first audio sequence with the corrected subsequence and the matching corresponding subsequences of the second audio sequence.

11. The computer system of claim 10, wherein the means for determining the location of the erroneous subsequence includes means for:

generating, through application of the dynamic time warping, a warping path that maps audio elements of the second audio sequence to equivalent audio elements of the first audio sequence; and identifying non-matching audio elements of the first audio sequence that do not have corresponding audio elements of the second audio sequence mapped thereto, the non-matching audio elements comprising the erroneous subsequence.

12. The computer system of claim 10, wherein the means for determining the one or more matching subsequences includes means for:

determining a time duration of the erroneous subsequence;

identifying a first portion and a second portion of the first audio sequence located on opposing sides of the erroneous subsequence, the first portion and the second portion each having a same time duration that is at least as long as the time duration of the erroneous subsequence such that the erroneous subsequence is centered between the first portion and the second portion in the first audio sequence.

13. The computer system of claim 10, further comprising means for acoustically matching the first audio sequence and the second audio sequence by modifying frequency components of the second audio sequence to match an energy of corresponding frequency components of the first audio sequence.

14. The computer system of claim 13, further comprising means for reducing noise from the first audio sequence and the second audio sequence prior to modifying the frequency components of the second audio sequence.

15. The computer system of claim 10, wherein the means for generating the corrected first audio sequence includes means for crossfading the matching corresponding subsequences of the second audio sequence into the first audio sequence.

16. The computer system of claim 8, further comprising means for determining, based on correlating the first audio sequence and the second audio sequence, whether said crossfading includes a linear crossfade or a constant power crossfade.

17. A non-transitory computer-readable storage medium storing instructions that, upon execution by a processor of a computing device, configure the computing device to perform operations comprising:

receiving a first audio sequence and a second audio sequence, the first audio sequence including an erroneous subsequence and the second audio sequence including a corrected subsequence for replacement of the erroneous subsequence in the first audio sequence;

determining a location of the erroneous subsequence in the first audio sequence by applying dynamic time warping to correlate the first audio sequence and the second audio sequence;

determining one or more matching subsequences of the first audio sequence that are (i) located proximate to the erroneous subsequence in the first audio sequence and (ii) match corresponding subsequences of the second audio sequence located proximate to the corrected subsequence;

generating a corrected first audio sequence by replacing the erroneous subsequence and the one or more matching subsequences of the first audio sequence with the corrected subsequence and the matching corresponding subsequences of the second audio sequence.

18. The non-transitory computer-readable storage medium of claim 17, wherein determining the location of the erroneous subsequence includes:

generating a warping path that maps audio elements of the second audio sequence to equivalent audio elements of the first audio sequence by manipulating a length of a first signal transform corresponding to the second audio sequence to match a length of a second signal transform corresponding to the first audio sequence; and identifying non-matching audio elements of the first audio sequence that do not have corresponding audio elements of the second audio sequence mapped thereto, the non-matching audio elements comprising the erroneous subsequence.

19. The non-transitory computer-readable storage medium of claim 17, wherein determining the one or more matching subsequences includes:

determining a time duration of the erroneous subsequence;

identifying a first portion and a second portion of the first audio sequence located on opposing sides of the erroneous subsequence, the first portion and the second portion each having a same time duration that is at least as long as the time duration of the erroneous subsequence such that the erroneous subsequence is centered between the first portion and the second portion in the first audio sequence.

20. The non-transitory computer-readable storage medium of claim 17, the operations further comprising:

acoustically matching the first audio sequence and the second audio sequence by modifying frequency components of the second audio sequence to match an energy of corresponding frequency components of the first audio sequence and reducing noise from the first audio sequence and the second audio sequence prior to said modifying the frequency components of the second audio sequence.

* * * * *